(12) United States Patent
Shreedhar et al.

(10) Patent No.: US 12,282,658 B1
(45) Date of Patent: Apr. 22, 2025

(54) SYSTEM AND METHOD FOR LARGE MEMORY TRANSACTION (LMT) STORES

(71) Applicant: Marvell Asia Pte Ltd, Singapore (SG)

(72) Inventors: Aadeetya Shreedhar, Natick, MA (US); Jason D. Zebchuk, Edinburgh (GB); Wilson P. Snyder, II, Holliston, MA (US); Albert Ma, Belmont, MA (US); Joseph Featherston, Boston, MA (US)

(73) Assignee: Marvell Asia Pte Ltd, Singapore (SG)

( * ) Notice: Subject to any disclaimer, the term of this patent is extended or adjusted under 35 U.S.C. 154(b) by 0 days.

(21) Appl. No.: 18/583,457

(22) Filed: Feb. 21, 2024

Related U.S. Application Data

(63) Continuation of application No. 17/937,128, filed on Sep. 30, 2022, now Pat. No. 11,960,727.

(60) Provisional application No. 63/394,060, filed on Aug. 1, 2022.

(51) Int. Cl.
*G06F 3/06* (2006.01)
*G06F 12/1045* (2016.01)

(52) U.S. Cl.
CPC .......... *G06F 3/0611* (2013.01); *G06F 3/0629* (2013.01); *G06F 3/0659* (2013.01); *G06F 3/0673* (2013.01); *G06F 12/1045* (2013.01); *G06F 2212/1024* (2013.01)

(58) Field of Classification Search
CPC .... G06F 3/0611; G06F 3/0629; G06F 3/0659; G06F 3/0673; G06F 12/1045; G06F 2212/1024
See application file for complete search history.

(56) References Cited

U.S. PATENT DOCUMENTS

| 5,996,042 | A  | * | 11/1999 | Pawlowski | ......... G06F 13/1668 |
|---|---|---|---|---|---|
|  |  |  |  |  | 711/105 |
| 9,501,243 | B2 |  | 11/2016 | Kessler et al. | |
| 11,960,727 | B1 |  | 4/2024 | Shreedhar et al. | |
| 2015/0100747 | A1 |  | 4/2015 | Kessler | |
| 2015/0261535 | A1 |  | 9/2015 | Snyder, II et al. | |
| 2017/0286113 | A1 |  | 10/2017 | Shanbhogue | |
| 2020/0034236 | A1 | * | 1/2020 | Williams | ................ G06F 9/467 |

OTHER PUBLICATIONS

"AMBA® 5 CHI;" Architecture Specification, 2020, Arm Limited.

* cited by examiner

*Primary Examiner* — Sean D Rossiter
(74) *Attorney, Agent, or Firm* — Hamilton, Brook, Smith & Reynolds, P.C.

(57) ABSTRACT

A system and corresponding method perform large memory transaction (LMT) stores. The system comprises a processor associated with a data-processing width and a processor accelerator. The processor accelerator performs a LMT store of a data set to a coprocessor in response to an instruction from the processor targeting the coprocessor. The data set corresponds to the instruction. The LMT store includes storing data from the data set, atomically, to the coprocessor based on a LMT line (LMTLINE). The LMTLINE is wider than the data-processing width. The processor accelerator sends, to the processor, a response to the instruction. The response is based on completion of the LMT store of the data set in its entirety. The processor accelerator enables the processor to perform useful work in parallel with the LMT store, thereby improving processing performance of the processor.

35 Claims, 8 Drawing Sheets

SYSTEM AND METHOD FOR LARGE MEMORY TRANSACTION (LMT) STORES

RELATED APPLICATIONS

This application is a continuation of U.S. application Ser. No. 17/937,128, filed on Sep. 30, 2022, now U.S. Pat. No. 11,960,727, which claims the benefit of U.S. Provisional Application No. 63/394,060, filed on Aug. 1, 2022. The entire teachings of the above applications are incorporated herein by reference.

BACKGROUND

Advances in microprocessor technology have led to increases in processing capabilities of microprocessor chip devices. Among factors contributing to such increase is the use of coprocessors in a chip device. Coprocessors perform specific processing tasks, such as input/output (I/O) operations, compression/decompression tasks, hardware acceleration, work scheduling, etc., for non-limiting examples, thereby offloading such tasks from core processors on the chip device. In performing such tasks, coprocessors are configured to communicate with core processors. Specifically, coprocessors may receive instructions and/or data from core processors and may provide results of same back to the core processors.

SUMMARY

According to an example embodiment, a system comprises a processor associated with a data-processing width and a processor accelerator. The processor accelerator is configured to perform a large memory transaction (LMT) store of a data set to a coprocessor in response to an instruction from the processor that targets the coprocessor. The data set corresponds to the instruction. The LMT store includes storing data from the data set, atomically, to the coprocessor based on a LMT line (LMTLINE). The LMTLINE is wider than the data-processing width. The processor accelerator is further configured to send, to the processor, a response to the instruction. The response is based on completion of the LMT store of the data set in its entirety. The LMT store may be referred to interchangeably herein as a LMTST.

The data set may include a plurality of LMT lines (LMTLINEs) of data. The response may be a single response to the instruction that is based on completion of the LMT store of the plurality of LMTLINES of data of the data set.

The processor may be further configured to perform work in parallel with the LMT store performed by the processor accelerator.

The LMT store of the data set, in its entirety, may appear, from the perspective of the processor, as having been performed via a single instruction.

The processor accelerator may be employed by the processor, exclusively.

The system may be a system-on-a-chip (SoC). The SoC may include the processor, processor accelerator, and coprocessor.

The storing may include iteratively storing data from the data set to the coprocessor, atomically, on a LMTLINE-by-LMTLINE basis.

The system may further comprise memory. The processor may be configured to store the data set, in its entirety, to the memory prior to issuing the instruction.

The processor may be configured to map a contiguous region of the memory as cacheable memory and to store the data set, in its entirety, to the contiguous region of the memory.

The data set may be associated with a pairing of a physical function (PF) and a virtual function (VF). The VF may be associated with the PF. The processor may be configured to store the data set in a contiguous region of the memory. The contiguous region of the memory may be associated with the pairing of the PF and VF.

The processor accelerator may include a LMT physical-address cache (LPC). The processor accelerator may be further configured to store a physical address (PA) of a LMTLINE of data from the data set in the LPC in association with a PF identifier of a PF and a VF identifier of a VF. The PF and VF may be associated with the data set.

The data set may include a plurality of LMT lines (LMTLINEs) of data. The processor accelerator may be further configured to determine a total number of LMTLINEs of the plurality of LMTLINEs of the data set based on the instruction.

The system may further comprise a last level cache (LLC) controller and an input/output bridge (IOB). The storing may include issuing at least one read instruction to the LLC controller to request a LMTLINE of data from the data set. The storing may further include issuing a write command to the IOB. The storing may further include sending the LMTLINE of data requested to the IOB for storing at the coprocessor, atomically. Such a store may be considered atomic from the perspective of the coprocessor as the store may appear, from the perspective of the coprocessor, as performed via a single transaction. The sending may be based on a) receipt of the LMTLINE of data requested and b) receipt of an acknowledgement from the IOB to the write command issued.

The processor accelerator may be further configured to perform the issuing of the at least one read instruction, issuing of the write command, and sending of the LMTLINE of data, iteratively, on a LMTLINE-by-LMTLINE basis.

The IOB may include a LMT store scheduling widget (LSW). The LSW may be configured to assign a LSW identifier (ID) to the LMT store for ordering the LMT store relative to another LMT store. The acknowledgment may include the LSW ID. Sending the LMTLINE of data to the IOB may include sending the LSW ID with the LMTLINE of data.

The system may further comprise a non-coherent fully associative cache, a first memory, and a second memory. The processor accelerator may be further configured to obtain a PA at which the data set is stored in the first memory. The PA may be obtained via the non-coherent fully associative cache or the second memory. The processor accelerator may be further configured to issue at least one read instruction to request a LMTLINE of data from the data set. The at least one read instruction may include an address of the LMTLINE, the address based on the PA obtained.

The processor accelerator may include a plurality of engines. An engine of the plurality of engines may be configured to handle the LMT store. Another engine of the plurality of engines may be configured to handle another LMT store of a different data set, different from the data set handled by the LMT store.

According to another example embodiment, a method may comprise performing, by a processor accelerator, a large memory transaction (LMT) store of a data set to a coprocessor in response to an instruction from a processor targeting the coprocessor. The processor is associated with a data-processing width. The data set corresponds to the instruction. The performing includes storing data from the data set, atomically, to the coprocessor based on a LMT line (LMTLINE). The LMTLINE is wider than the data-processing width. The method further comprises sending, from the processor accelerator to the processor, a response to the instruction. The response is based on completion of the LMT store of the data set in its entirety.

Further alternative method embodiments parallel those described above in connection with the example system embodiment.

According to another example embodiment, an apparatus may comprise means for performing a large memory transaction (LMT) store of a data set to a coprocessor in response to an instruction from a processor targeting the coprocessor. The processor is associated with a data-processing width. The data set corresponds to the instruction. The performing includes storing data from the data set, atomically, to the coprocessor based on a LMT line (LMTLINE). The LMTLINE is wider than the data-processing width. The apparatus further comprises means for sending, to the processor, a response to the instruction. The response is based on completion of the LMT store of the data set in its entirety.

Further alternative apparatus embodiments parallel those described above in connection with the example system embodiment.

It should be understood that example embodiments disclosed herein can be implemented in the form of a method, apparatus, system, or computer readable medium with program codes embodied thereon.

BRIEF DESCRIPTION OF THE DRAWINGS

The foregoing will be apparent from the following more particular description of example embodiments, as illustrated in the accompanying drawings in which like reference characters refer to the same parts throughout the different views. The drawings are not necessarily to scale, emphasis instead being placed upon illustrating embodiments.

DETAILED DESCRIPTION

Figure 1:
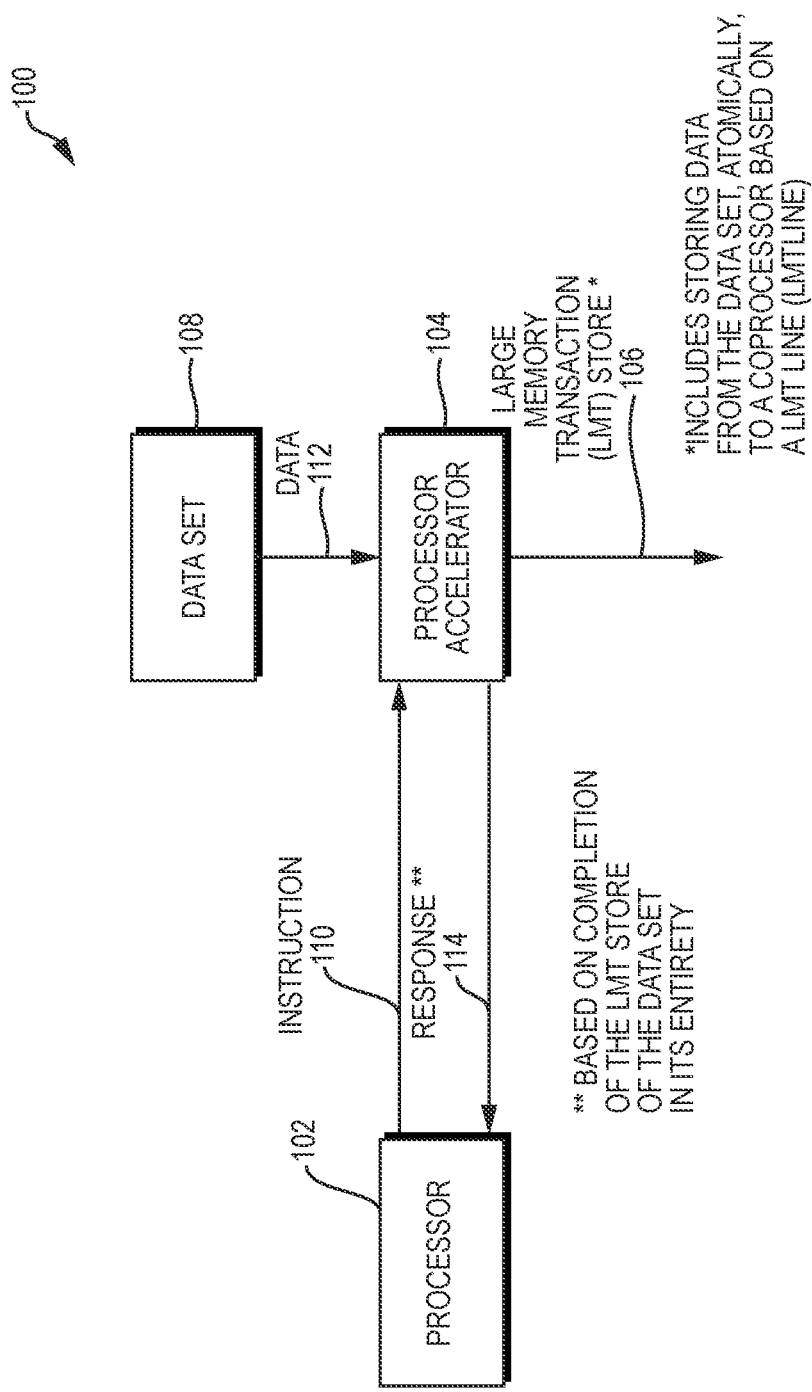
FIG. 1 is a block diagram of an example embodiment of a system.

A description of example embodiments follows.

The term "work," as referred to herein, refers generally to a software routine or handler to be performed on some data, such as packet data for non-limiting example. A flow control unit (flit), as referred to herein, refers to data that may accompany a command or response.

An "atomic" store, as referred to herein, is a store operation (instruction) that may be performed via a plurality of operations (instructions); however, such a store operation appears to have transpired via a single store operation from the perspective of an issuer of the atomic store and an accessor of the memory targeted by the atomic store. As such, an intermediate state of such memory during which an operation of the atomic store is manipulating the memory is not visible in an event such memory is read and such memory cannot be written by another component that is not performing an operation of the atomic store. Since the atomic store appears as a single operation, the reader of such memory views same in a state it was in, prior to the atomic store, so long as the atomic store is in progress. Once the atomic store has completed, the memory content as modified via the atomic store is visible.

A data-processing width of a processor, as referred to herein, refers to a fixed width of a processor. In a processor, registers, address buses, and data buses typically have a fixed width, e.g., 32 bits or 64 bits for non-limiting examples. As such, any memory access operation, logic operation, or any other operation by the processor is usually restricted by the fixed width. That is, all memory addresses, integers, and data words supported by the processor have a size or width equal to the fixed width. The fixed width of the registers, address buses, and data buses for a processor may be referred to herein as a data word width of the processor or the data-processing width of the processor.

While example embodiments disclosed herein may be described with reference to the ARM® Advanced Microcontroller Bus Architecture (AMBA®) Coherent Hub Interface (CHI) protocol read/write instructions and their associated response/acknowledge/data, it should be understood that such embodiments are not limited to being CHI-based and such read/write instructions, and their associated response/acknowledge/data, may vary depending on an interconnect employed in a multicore processor-based system.

A multicore processor-based system may employ a coherent interconnect sub-system with an input/output bridge (IOB), such as disclosed further below with regard to FIGS. 6A and 6B, to interface with other components in the system, such as a coprocessor etc. A processor core of such a multicore processor-based system may be referred to interchangeably herein as a central processing unit (CPU), application processor (AP), core, or simply, a processor. In such a system, a coprocessor may be mapped to device memory space. It is useful for the processor to target the coprocessor using wide, multi-word stores. Issuing a sequence of several store instructions to device memory space may, however, cause the processor to idle/stall, preventing the processor from doing other useful work until the last store in the sequence is acknowledged.

A round-trip latency (e.g., store request to store response) for each store request the processor issues to a coprocessor via, for example, an input/output bridge (IOB) and interconnect fabric, imposes a performance limitation on the processor. According to an example embodiment disclosed herein, a processor accelerator can be used to mitigate the effect of such round-trip latency on performance of a processor and can be used to advantageously perform wide atomic stores to components, offloading such wide atomic stores from the processor.

The atomic stores may be considered "wide" as such stores may store data of width that is wider (greater) than a data-processing width of the processor. Such wide atomic stores may be issued to a network interface unit (NIX) 671 and/or cryptographic accelerator unit (CPT) 678 of FIG. 6B, disclosed further below, for non-limiting examples. An example embodiment of a system that employs a processor accelerator that may perform a wide, atomic store based on large memory transaction (LMT) line (LMTLINE) is disclosed below with regard to FIG. 1.

FIG. 1 is a block diagram of an example embodiment of a system 100. The system 100 comprises a processor 102 associated with a data-processing width (not shown). The processor 102 may be referred to interchangeably herein as an application processor (AP). The system 100 further comprises a processor accelerator 104. The processor accelerator 104 may be referred to interchangeably herein as an AP attachment (APA).

The processor accelerator 104 is configured to perform a large memory transaction (LMT) store 106 of a data set 108 to a coprocessor (not shown) in response to an instruction 110 from the processor 102 targeting the coprocessor. The data set 108 corresponds to the instruction 110. The LMT store 106 includes storing data 112 from the data set 108, atomically, to the coprocessor based on a LMT line (LMTLINE) (not shown). The LMTLINE is wider than the data-processing width. The processor accelerator 104 is further configured to send, to the processor 102, a response 114 to the instruction 110. The response 114 is based on completion of the LMT store 106 of the data set 108 in its entirety. According to an example embodiment, the system 100 may be a system-on-a-chip (SoC). The SoC may include the processor 102, processor accelerator 104, and coprocessor.

According to an example embodiment, the processor 102 may be configured to set up the LMT store 106, also referred to interchangeably herein as a LMTST. Such setup may include configuring a LMT map table (not shown) in memory of the system 100 (not shown). The LMT map table setup may include writing a LMT map base register, referred to interchangeably herein as a APR_AF_LMT_MAP_BASE register, to specify a physical base address for the LMT map table in dynamic random-access memory (DRAM) for non-limiting example.

The LMT map table may include a LMT map entry that may, for non-limiting example, be a 16-byte entry, referred to interchangeably herein as a APR_LMT_MAP_ENTRY_S, for each function (FUNC) in each physical function (PF). The FUNC may be a virtual function (VF). Each APR_LMT_MAP_ENTRY_S may specify the base address and number of LMTLINEs for a given {PF, FUNC} pairing. An LMTLINE may be the data for a single wide atomic store up to 128 bytes wide. The processor 102 may be further configured to allocate the LMT map table—up to 128 KB for non-limiting example—and initialize same with zeros for non-limiting example.

The processor 102 may be further configured to allocate 16, 512, or 2K LMT lines (LMTLINEs) in a contiguous region of memory that is mapped as normal, cacheable memory, and may be configured to populate the LMT map table with the physical base address of such a region in memory. As such, the processor 102 may be configured to map a contiguous region of the memory as cacheable memory and to store the data set 108, in its entirety, to the contiguous region of the memory. The data set 108 may be associated with a pairing of a physical function (PF) (not shown) and a virtual function (VF) (not shown). The VF may be associated with the PF. The contiguous region of the memory may be associated with the pairing of the PF and VF.

The processor 102 may be configured to store data of the LMTLINE using standard (non-atomic) store instructions and may then trigger the LMTST using the instruction 110 that may be a STEOR instruction for non-limiting example. As such, the processor 102 may be configured to store the data set 108, in its entirety, to the memory prior to issuing the instruction 110.

The processor accelerator 104 may, in turn, receive the instruction 110 (e.g., STEOR), and may be further configured to infer a PF, FUNC, resource virtualization unit (RVU) block, size of the LMTST (either a single LMTST or a burst of up to 16 LMTLINEs for non-limiting example), and the size of each LMTLINE in the burst, from the instruction 110 (e.g., STEOR) address and data.

The processor accelerator 104 may include a LMTST Accelerator (LSA) sub-block, disclosed further below with regard to FIG. 3. The LSA may be configured to access a private, 32-entry non-coherent fully associative cache with pseudo-least-recently-used (LRU) replacement in order to obtain the physical address of the LMTLINEs that are the subject of the instruction 110 from the processor 102. Such physical address may be obtained without having to wait for the instruction's data, and without having to read the LMT map table in the DRAM. The processor accelerator 104 and, more specifically, the LSA, may be configured to read the LMT map table from DRAM on a cache miss in order to obtain the physical address.

The LSA may issue read instructions to fetch, for non-limiting example, up to 128-bytes of data that make up each LMTLINE. The exact read instruction may depend on specifics of an interconnect of a chip on which the processor 102 and processor accelerator 104 are located. Such a read instruction (command) may be referred to as a ReadOnce command for non-limiting example. The responses for each LSA issued ReadOnce command may be referred to as a CompData response that includes a flow control unit (flit), that is, the read data, and such response may arrive from a switch on the chip or a local processor, if the data was resident in the local processor's private L1/L2 cache.

The LSA may be further configured to issue write instructions to an input/output (I/O) bridge (IOB), disclosed further below. The exact write instruction may depend on the details of the interconnect and such write instruction may be referred to as a WriteNoSnoop (WriteNoSnp) for non-limiting example. Upon receiving a CompDBIDResp from the IOB, the LSA may be further configured to send the data that makes up the LMTLINE to the IOB as NonCopyBack-WrData for non-limiting example. The processor accelerator 104 may be configured to maintain order while issuing the WriteNoSnoops to the IOB.

When the LSA receives the last CompData for read instructions issued, as disclosed above, and the last CompDBIDResp for the write instructions issued, as disclosed above, the LSA may be further configured to send the response 114 that may represent a completion response to the processor 102 indicating that the instruction 110 (e.g., STEOR) is fully processed. As a result, the target coprocessor may receive up to 128 bytes of the wide store atomically, with a same NCBWrData command as a large write from a peripheral component interconnect (PCI).

The processor accelerator 104 may be employed by the processor 102, exclusively. That is, there may a 1:1 mapping between the processor accelerator 104 and the processor 102. The processor 102 may be further configured to perform work (not shown) in parallel with the LMT store 106 (i.e., LMTST) performed by the processor accelerator 104. The LMT store 106 of the data set 108, in its entirety, may appear, from the perspective of the processor 102, as having been performed via a single instruction.

The data set 108 may include a plurality of LMT lines (LMTLINEs) of data (not shown). The processor accelerator 104 may be further configured to determine a total number of LMTLINEs of the plurality of LMTLINEs of the data set 108 based on the instruction 110. The response 114 may be a single response to the instruction 110 that is based on completion of the LMT store 106 of the plurality of LMT-LINES of data of the data set 108.

As disclosed above, the LMT store 106 includes storing data 112 from the data set 108, atomically, to the coprocessor. The storing may include iteratively storing data from the data set 108 to the coprocessor, atomically, on a LMTLINE-by-LMTLINE basis.

The system 108 may further comprise a last level cache (LLC) controller (not shown) and an input/output bridge (IOB) (not shown). The storing may include issuing at least one read instruction to the LLC controller to request a LMTLINE of data from the data set 108. The storing may further include issuing a write command to the IOB. The storing may further include sending the LMTLINE of data requested to the IOB for storing at the coprocessor, atomically. Such a store may be considered atomic from the perspective of the coprocessor as the store may appear, from the perspective of the coprocessor, as performed via a single transaction. The sending may be based on a) receipt of the LMTLINE of data requested and b) receipt of an acknowledgement from the IOB to the write command issued. According to an example embodiment, the LMTLINE of data may be mapped to main memory in the system 100 and the processor accelerator 104 of the processor 102 may located closer to the main memory relative to the processor 102.

The processor accelerator 104 may be further configured to perform the issuing of the at least one read instruction, issuing of the write command, and sending of the LMTLINE of data, iteratively, on a LMTLINE-by-LMTLINE basis.

Figure 2:
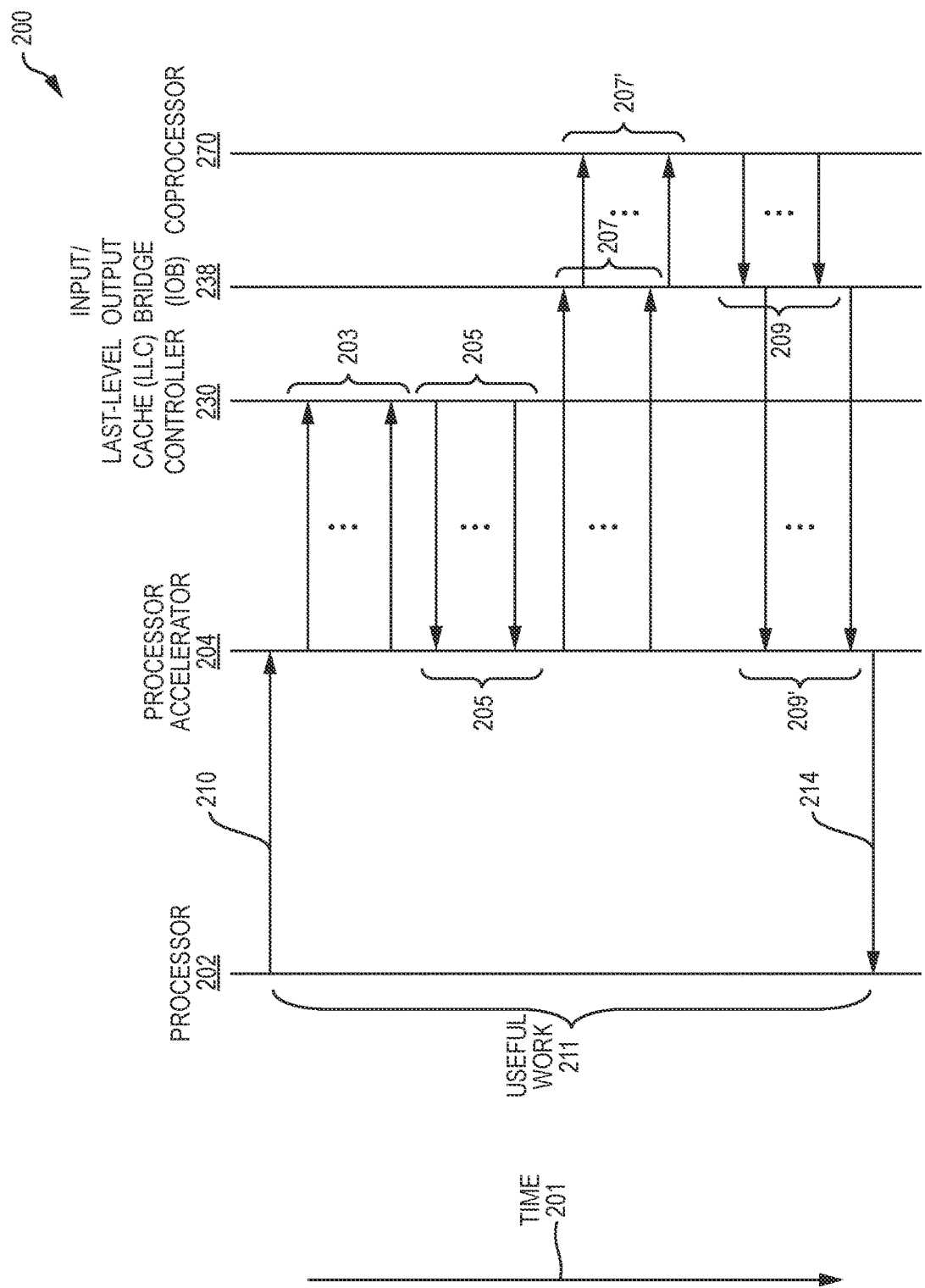
FIG. 2 is a bounce diagram of an example embodiment of transaction flows for a large memory transaction (LMT) store.

According to an example embodiment, the IOB may include a LMT store scheduling widget (LSW) (not shown). The LSW may be configured to assign a LSW identifier (ID) to the LMT store 106 for ordering the LMT store 106 relative to another LMT store. The acknowledgment from the IOB to the write command issued may include the LSW ID. Sending the LMTLINE of data to the IOB may include sending the LSW ID with the LMTLINE of data. FIG. 2, disclosed below, is a bounce diagram of an example embodiment of transaction flows for the LMT store 106 that involves the IOB.

FIG. 2 is a bounce diagram 200 of an example embodiment of transaction flows for a LMT store. In the bounce diagram 200, the transaction flows are among a processor 202, processor accelerator 204, a last-level cache (LLC) controller 230, an input/output (I/O) bridge (IOB) 238, and a coprocessor 270. The processor 202 sends an instruction 210 targeting the coprocessor 270. The instruction 210 may represent a single atomic write/store command and may be a store-exclusive-or-atomic (STEOR) instruction for non-limiting example.

The processor accelerator 204 intercepts the instruction 201 and performs a series of read instructions 203 to procure the data for the atomic store. Such data 205 may be procured via the LLC controller 230 that may be responsible for determining where the data is located, such as in a LLC or DRAM. The processor accelerator 204 may package the data 205 procured and send a series of write instructions 207 via the IOB 238 to the coprocessor 270 that may receive the procured data 205 by way of the write instructions 207' from the IOB 238. The coprocessor may acknowledge the write instructions 207' by sending corresponding acknowledgements 209 to the processor accelerator 204 via the IOB 238 and such acknowledgements 209' may be received by the processor accelerator 204 which may, in turn, collect same to determine when to send a response 214, namely a single completion response to the instruction 210 that may represent completion of the single, atomic write/store. During the time 201 that transpires between issuance of the instruction 210 from the processor 202 and receipt of the response 214 by the processor 202, the processor 202 is free to perform useful work 211 and is not forced to idle/stall as may otherwise be the case.

With reference back to FIG. 1, the processor accelerator 104 may include a plurality of engines. An engine of the plurality of engines may be configured to handle the LMT store 106. Another engine of the plurality of engines may be configured to handle another LMT store of a different data set, different from the data set handled by the LMT store, such as disclosed below with regard to FIG. 3.

Figure 3:
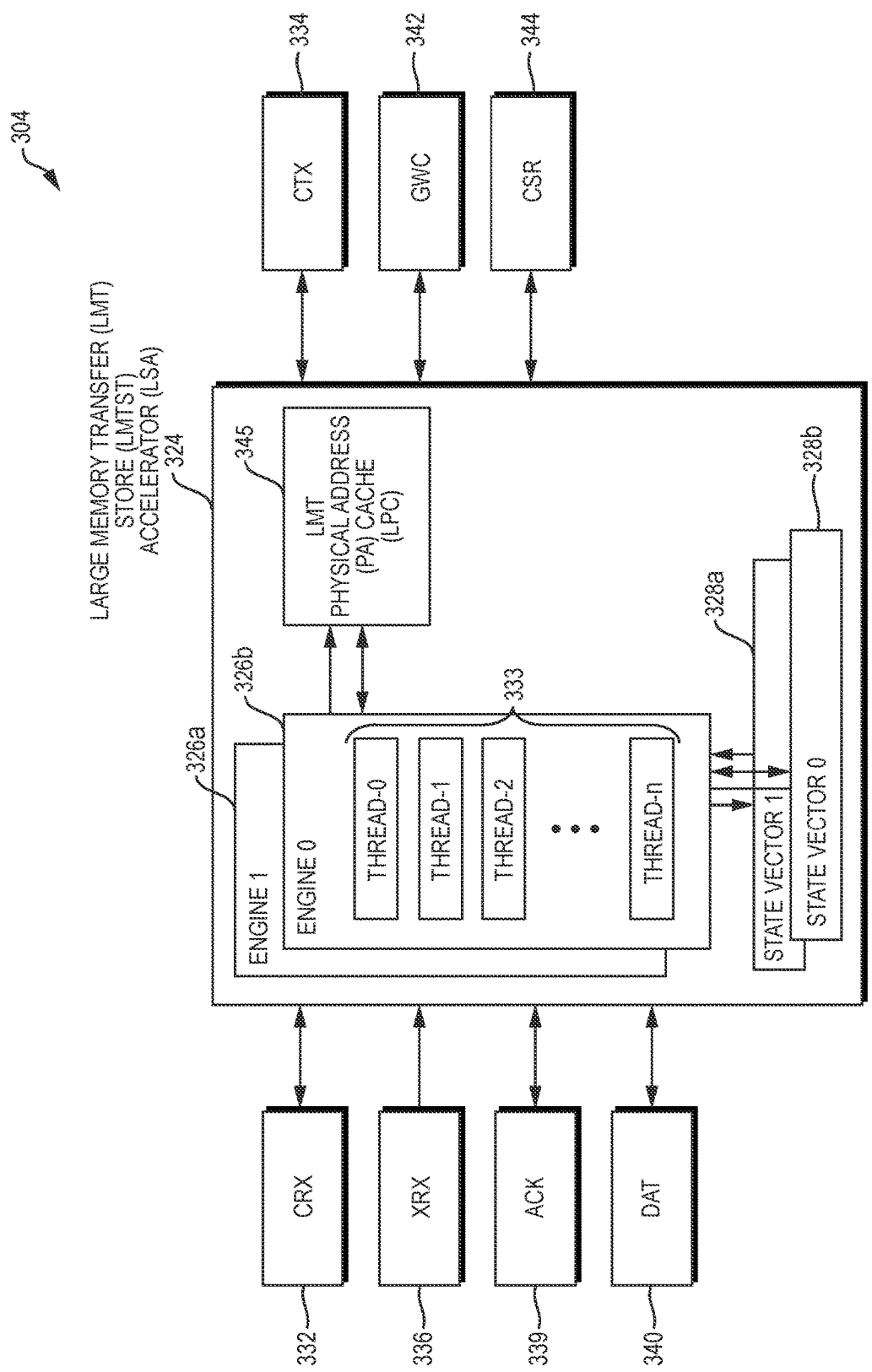
FIG. 3 is a block diagram of an example embodiment of a processor accelerator.

FIG. 3 is a block diagram of an example embodiment of a processor accelerator 304 of a processor (not shown), such as the processor accelerator 104 and processor accelerator 204 of FIG. 1 and FIG. 2, respectively, disclosed above. Continuing with reference to FIG. 3, the processor accelerator 304 may include a core receiver (CRX) 332 sub-block. The CRX 332 may be coupled to the processor (core) via request (Req), response (Rsp), and data (Dat) channels (not shown), to receive requests, responses, and data, respectively, from the core. The CRX 332 may be further configured to detect a transaction, intercept the transaction detected, and forward the transaction intercepted to a sub-block of the processor accelerator 304. Such an intercepted transaction may be an instruction to perform an LMTST and may, for example, be the instruction 110 of FIG. 1, disclosed above.

Continuing with reference to FIG. 3, the processor accelerator 304 may further include a core transmitter (CTX) 334 sub-block. The CTX 334 may be configured to arbitrate between processor accelerator 304 sub-blocks that want to issue transactions to the core. The CTX 334 may select from same and send a selected transaction to the core.

The processor accelerator 304 may further include another "X" receiver, namely the XRX 336 receiver, that may be analogous to the CRX 332 in that it may be configured to receive and decode transactions to the processor accelerator 304 that arrive inbound from a mesh, that is, an interconnect of the chip.

The processor accelerator 304 may further include an ACK 339 sub-block that may be configured to generate read-receipts and responses, such as a DBIDResp for non-limiting example, to accelerate ordered requests to device memory, and may be further configured to send such read-receipts and responses to the processor. The processor accelerator 304 may further include a Data Buffer (DAT) 340 sub-block that may be configured to hold the data, such as the NCBWrData for non-limiting example, for I/O write acceleration and LMT stores (LMTSTs).

The processor accelerator 304 may further include a GetWork Cache (GWC) 342 sub-block that may communicate with a Schedule/Sync and Order (SSO) module, directly, such as the SSO 602 of FIG. 6A, disclosed further below.

Continuing with reference to FIG. 3, the processor accelerator 304 may further include a control and status register (CSR) sub-block 344 that may be configured to handle CSRs and interrupts. The processor accelerator 304 may further include a LMTST accelerator (LSA) 324 sub-block. The LSA 324 sub-block may be configured to generate transactions for handling LMTSTs. The LSA 324 may read the physical address (PA) for LMTLINEs.

The LSA 324 includes two engines (326a, 326b) that can independently perform functions of the processor accelerator 304 to store a LMTST to a coprocessor, atomically, as disclosed herein. Each engine may be configured to store respective state and flags in a respective state vector (328a, 328b) that may be employed to track progress of a respective LMTST. A first state vector 328 of the first engine 326a may be visible to the peer-engine, that is, the second engine 326b, and vice versus, to ensure proper interlocks.

An interlock may, for non-limiting example, enforce that an engine processing a regular LMTST won't issue a write command, such as a WriteNoSnp, if the engine sees that it's peer-engine is already working on a previous LMTST and hasn't issued all of its write commands, such as WriteNoSnps, for implementing same. In this way, the processor accelerator 304 is configured to maintain order among accesses to device memory and, thus, to a coprocessor mapped to same.

Each LSA engine (326, 326b) may break its logic down into a series of actions that all have the same start/initialization conditions. Such actions may be called threads 333 (e.g., thread-0, thread-1, thread-2, . . . , thread-n). The threads 333 may be viewed as several interlocking state-machines. A total number of possible state-transitions may increase rapidly and, as such, the LSA 324 may be configured to only check a thread of the threads 333 when the thread can start, based on a state-vector (328a, 328b), and when the thread prevents another thread of the threads 333 from starting. Such an implementation enables modification of a start condition for each thread, at least partially, by CSR controlled bits, in order to make the LSA 324 more conservative in how it tries to parallelize threads.

The processor accelerator 304 further includes a LMT physical address (PA) cache (LPC) 345. The LPC 345 may cache, 32, for non-limiting example, of the most recently used APR_LMT_MAP_ENTRY_S entries. The LPC 345 may be implement as a content-addressable memory (CAM) and a tag used for searching for a PA in same may be a combination of a physical function (PF) and function (FUNC) of the PF, namely a {PF, FUNC} pairing. The processor accelerator 304 may employ a least-recently-used (LRU) replacement policy on the LPC. The LRU policy may be a 1-bit-pseudo-LRU replacement policy for non-limiting example. The FUNC may be a virtual function (VF).

With reference to FIG. 1 and FIG. 3, the processor accelerator 304 may be further configured to store a physical address (PA) of a LMTLINE of data from the data set 108 in the LPC 345 in association with a PF identifier of a PF and a VF identifier of a VF. The PF and VF may be associated with the data set. The system 100 may further comprise a non-coherent fully associative cache, a first memory, and a second memory. The second memory may be dynamic random-access memory (DRAM), for non-limiting example. The processor accelerator 304 may be further configured to obtain a PA at which the data set 108 is stored in the first memory. The PA may be obtained via the non-coherent fully associative cache or the second memory. The processor accelerator 304 may be further configured to issue at least one read instruction to request a LMTLINE of data from the data set 108. The at least one read instruction may include an address of the LMTLINE. The address may be based on the PA obtained. The LPC 345 may be employed as the non-coherent fully associative cache.

The LPC 345 may store predictor information about which LMT identifier (ID) LMTID to use. The LMTID may be an identifier of an LMTLINE of data. With reference to FIG. 1 and FIG. 3, such LMTID may be an offset from a base physical address of the data set 108 in memory. The actual LMTID information may be encoded in data (not shown) of the instruction 110. Predicting the LMTID in the LPC 345 enables speculative ReadOnce_mem commands to be issued before the processor 102 responds with the data of the instruction 110. A bounce diagram of an example embodiment of transaction flows that employ such the ReadOnce_mem command is disclosed below with regard to FIG. 4A.

Figure 4A:
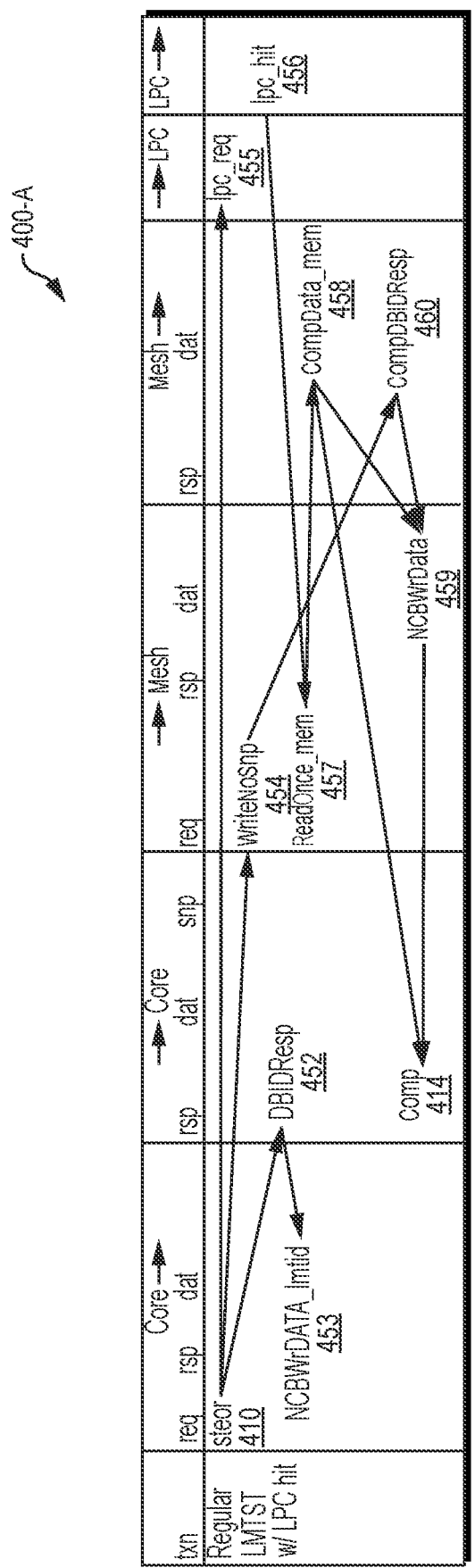
FIG. 4A is a bounce diagram of an example embodiment of transaction flows for a LMT store based on a LMT physical address (PA) cache (LPC) hit.

FIG. 4A is a bounce diagram 400-A of an example embodiment of transaction flows for a LMT store based on a LMT physical address (PA) cache (LPC) hit. With reference to FIG. 3 and FIG. 4A, the LSA 324 may work together with the DAT 340 and ACK 339 sub-blocks to roll out LMTSTs. The general control/data flow through the processor accelerator 304 may be as follows.

An LSA engine of the LSA engines (326a, 326b), which enable the LSA 324 to support two LMTSTs in flight simultaneously for non-limiting example, receives an instruction, such as a STEOR 410 command (request) for non-limiting example, whose address implies an LMTST. The ACK 339 may request the data associated with the request, that is, the instruction 410, by sending a response, namely the DBIDResp 452. An identifier (e.g., DBID) may be included in the DBIDResp 452 and may be a value based on which LSA engine (326a, 326b) is processing the request, namely the STEOR 410. Such an identifier is shown as the NCBWrData_Imtid 453.

The LSA 324 may, in turn, issue a write command, namely the WriteNoSnp 454 to the CRX 332. Such request may be assigned an identifier (e.g., TgtID) by a system address mapper (SAM) (not shown) sub-block of the LSA 324, and sent to a request buffer (RQB) (not shown) sub-block of the LSA 324. The identifier's four least-significant bits (4-LSBs) (not shown) may, for non-limiting example, point to a tail pointer of the DAT 340 and may indicate where, eventually, fill data for the request will be stored.

The LSA 324 may perform a lookup of a 16-entry cache, for non-limiting example, that stores recently accessed LMTLINEs using physical function (PF) and function (FUNC) identifier information in the STEOR 410 and may check the LPC 345 via the lpc-req 455 to see if there is a hit, in order to retrieve the physical address for the LMTLINE of data.

Figure 4B:
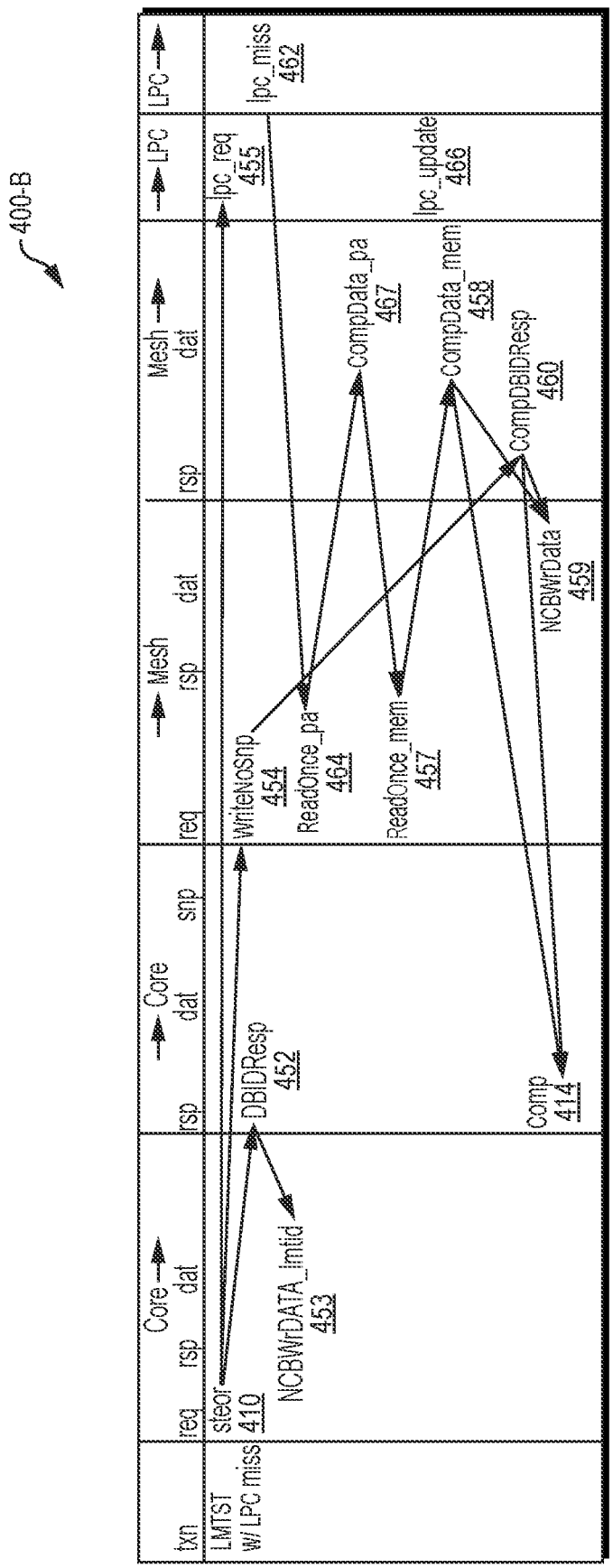
FIG. 4B is a bounce diagram of an example embodiment of transaction flows for a LMT store based on a LPC miss.

If there is a LPC hit, the lpc_hit 456 may cause the LSA 345 to issue a speculative command, such as the ReadOnce_mem 457 command to start fetching LMTLINE data using the address in the LPC 345, and a LMT line identifier (LMTLID) predicted by the LPC 345. A transaction identifier (TxnID) (not shown) may be included in the ReadOnce_mem command and the 4-LSBs (not shown) may point to the same DAT buffer entry as the WriteNoSnp 454. As such, the read's CompData_mem 458 returned from, for example, an LLC controller (not shown) in response to same, can be used as the NCBWrData 459 for the WriteNoSnp, and may be issued to the IOB (not shown) by the DAT 340 without LSA 324 involvement. Based on receiving the CompData_mem 458 and a response to the WriteNoSnp 454 command, namely the CompDBIDResp 460, the processor accelerator 304 may send a completion response, namely the Comp 414, to the processor (core). The bounce diagram 400-A shows transaction flows for a LMTST with a single LMTLINE of data for a case in which there is a hit in the LPC 345. FIG. 4B, disclosed below, shows the transaction flows for the case in which there is a miss in the LPC 345.

FIG. 4B is a bounce diagram 400-B of an example embodiment of transaction flows for a LMT store based on a LMT LPC miss. With reference to FIG. 3 and FIG. 4B, if there is a lpc_miss 462, the LSA 324 issues a ReadOnce command, namely the ReadOnce_pa 464 command, to fetch the physical address for the LMTLINE using a) the base address of a LMTLINE table, stored in CSRs maintained by the CSR 344 sub-block, and b) the PF_FUNC in the STEOR 410 command. The ReadOnce command referred to as ReadOnce_pa 464 includes the trailing "pa" to distinguish it from reads that fetch LMTLINE data, namely the ReadOnce_mem 457. Like WriteNoSnps, ReadOnce transactions are issued to the CRX 332, go through the SAM, and then go to the RQB of the processor accelerator 304. In response to the ReadOnce_pa 464, the physical address may be returned as the CompData_pa 467. When the processor (core) sends the STEOR 410 data, the LSA 324 detects if the ReadOnce triggered by an LPC-hit was a miss-speculation, and may corrects same, via the lpc_update 466.

The CompData_mem 458 for the ReadOnce_mem 457 can come in from XRX 336 sub-block-if the data was sent directly, or from the CRX 332 sub-block, if sent via a snoop to a processor that, in turn, forwarded the data to the processor accelerator 304. The CompData_mem 458 may be stored in the DAT 340 sub-block at the entry indicated by the 4-LSB's in a TxnID of the CompData_mem 456.

The DAT 340 sub-block may receive a CompDBIDResp 460 from the IOB for the entry in the buffer. The 4-LSBs of the CompDBIDResp 460 TxnID will match that sent with the original WriteNoSnp 454 which, in turn, points to the entry in the buffer, that is, the DAT 340 sub-block. The DAT 340 sub-block embeds the DBID in the buffer entry, issues it to a transmitter (XTX) sub-block (not-shown) of the LSA 324, and de-allocates the buffer entry.

If this was the only LMTLINE to send to the coprocessor, the LSA 324 sends the processor (core) the Comp 414 for the STEOR 410 and, otherwise, unrolls the LMTLINE burst and issues subsequent WriteNoSnps and ReadOnce_mems, as disclosed above. All LSA generated requests may be sent through the RQB which includes logic to handle retries.

While the LSA 324 issues the ReadOnce and WriteNoSnoop (WriteNoSnp) instructions, waits for the CompData and CompDBIDResp responses, and sends the NonCopyBackWriteData flits (units of data) to the IOB (mesh), the processor is offloaded and, thus, freed up to execute other useful work. Hardware acceleration of wide atomic stores hides the round-trip latencies for several ReadOnce and WriteNoSnp instructions, enables performance gains as the processor works on other instructions, and saves energy by decreasing overall program execution time. An example embodiment of a method that enables same is disclosed below with regard to FIG. 5.

Figure 5:
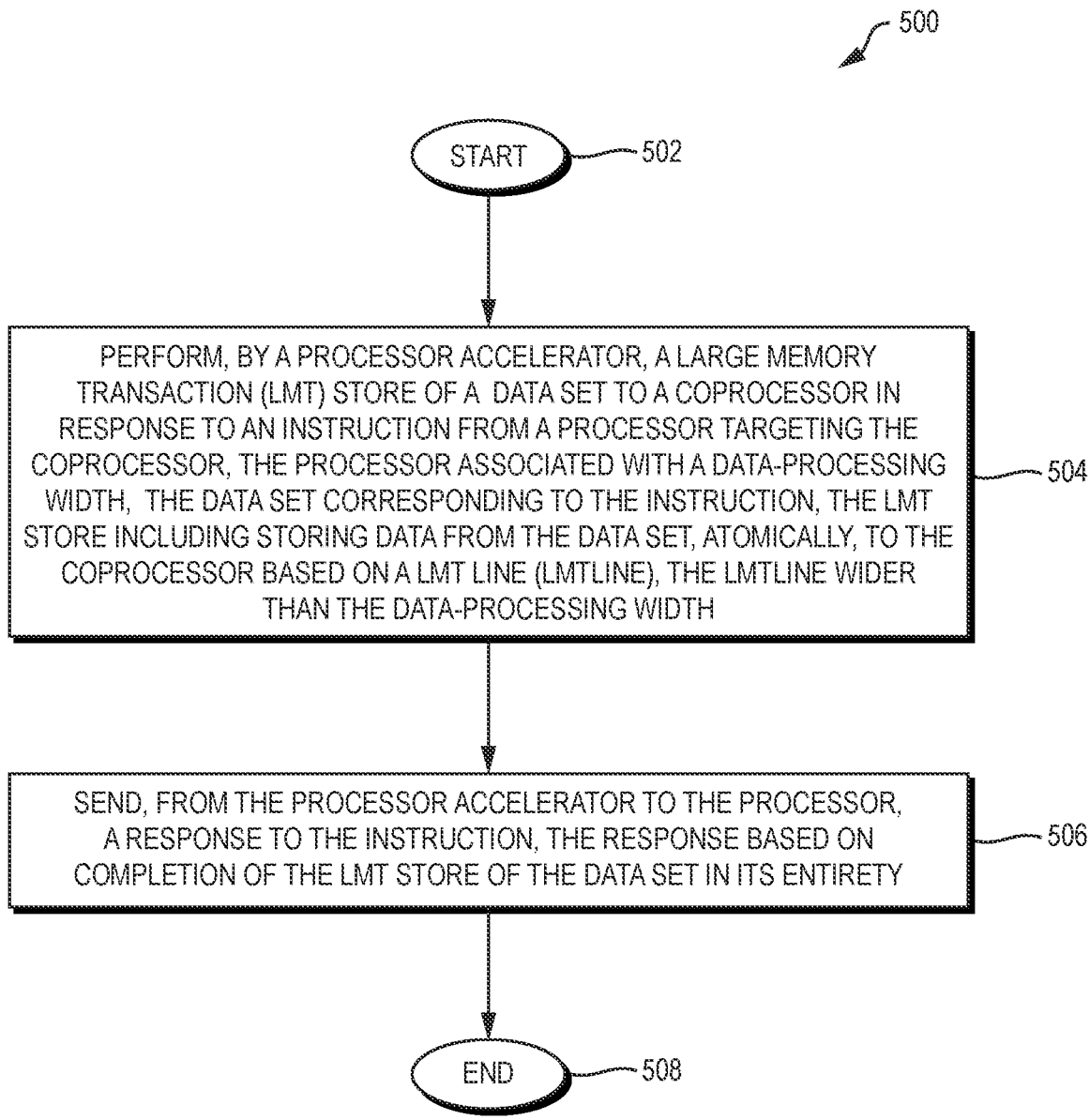
FIG. 5 is a flow diagram of an example embodiment of a method.

FIG. 5 is a flow diagram of an example embodiment of a method (500). The method begins (502) and comprises performing, by a processor accelerator, a large memory transaction (LMT) store of a data set to a coprocessor in response to an instruction from a processor targeting the coprocessor (504). The processor is associated with a data-processing width. The data set corresponds to the instruction. The performing includes storing data from the data set, atomically, to the coprocessor based on a LMT line (LMT-LINE), the LMTLINE wider than the data-processing width. The method further comprises sending, from the processor accelerator to the processor, a response to the instruction, the response based on completion of the LMT store of the data set in its entirety (506). The method thereafter ends (508) in the example embodiment.

Figure 6A:
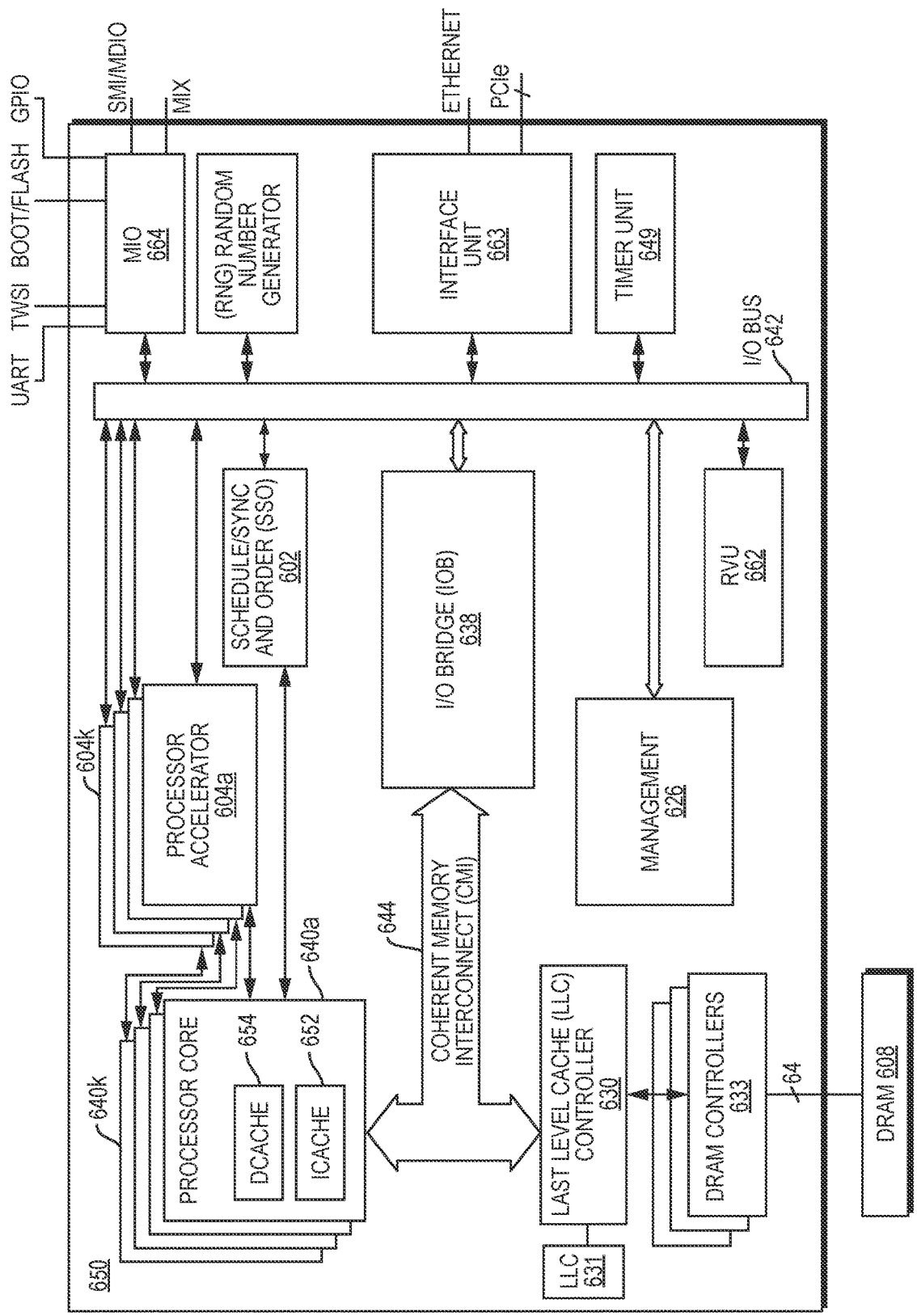
FIG. 6A is a block diagram of an example embodiment of a network services processor in which an example embodiment may be implemented.

FIG. 6A is a block diagram of an example embodiment of a network services processor 650 in which an example embodiment disclosed herein may be implemented. The network services processor 650 includes a plurality of processor cores, namely the processor cores 640a-k, that are each coupled to a respective processor accelerator, namely the processor accelerators 604a-k. With reference to FIG. 1 and FIG. 6A, the processor 102 may be a processor core from the processor cores 640a-k and the processor accelerator 104 may be a processor accelerator from the processor accelerators 640a-k. The network services processor 650 may process Open System Interconnection network L2-L7 layer protocols encapsulated in received packets. As is well-known to those skilled in the art, the Open System Interconnection (OSI) reference model defines seven network protocol layers (L1-L7). The physical layer (L1) represents the actual interface, electrical and physical that connects a device to a transmission medium. The data link layer (L2) performs data framing. The network layer (L3) formats the data into packets. The transport layer (L4) handles end to end transport. The session layer (L5) manages communications between devices, for example, whether communication is half-duplex or full-duplex. The presentation layer (L6) manages data formatting and presentation, for example, syntax, control codes, special graphics and character sets. The application layer (L7) permits communication between users, for example, file transfer and electronic mail.

The network services processor 650 may schedule and queue work (packet processing operations) for upper-level network protocols, for example L4-L7, and allow processing of upper level network protocols in received packets to be performed to forward packets at wire-speed. The network services processor 650 may schedule and queue work for applications that may be restricted to lower layers, e.g., forwarding at L2 or L3 at wire-speed. Wire-speed is the rate of data transfer of the network over which data is transmitted and received. By processing the protocols to forward the packets at wire-speed, the network services processor 650 does not slow down the network data transfer rate.

A packet is received for processing by an interface unit 663. The interface unit 663 performs pre-processing of the received packet by checking various fields in the network protocol headers (e.g., L2, L3 and L4 headers) included in the received packet and may perform checksum checks for TCP/User Datagram Protocol (UDP) (e.g., L4 transport protocols). The interface unit 663 may receive packets based on multiple network interface protocols, such as Ethernet and Peripheral Component Interconnect Express (PCIe). In a further embodiment, the interface unit 663 may be configured to receive packets from a plurality of X Attachment Unit Interfaces (XAUI), Reduced X Attachment Unit Interfaces (RXAUI), Serial Gigabit Media Independent Interfaces (SGMII), 40GBASE-R, 50GBASE-R, and/or 100GBASE-R. The interface unit 663 may also prepare and transmit outgoing packets based on one or more of the aforementioned interfaces.

The interface unit 663 may write packet data into buffers in the last level cache (LLC) 631 or to external DRAM 608. The packet data may be written into the buffers in a format convenient to higher-layer software executed in at least one processor core of the processor cores 640*a-k*. Thus, further processing of higher-level network protocols is facilitated.

The network services processor 650 can also include one or more application specific co-processors. These co-processors, when included, offload some of the processing from the processor cores 640*a-k*, thereby enabling the network services processor 650 to achieve high-throughput packet processing.

An I/O bridge (IOB) 638 is configured to manage the overall protocol and arbitration and provide coherent I/O portioning with an I/O Bus 642. The IOB 638 may include buffer queues for storing information to be transferred between a coherent memory interconnect (CMI) 644, the I/O Bus 642, and the interface unit 663. The IOB 638 may comprise a plurality of individual bridges on which communications and arbitration can be distributed.

The miscellaneous I/O interface (MIO) 664 can include auxiliary interfaces such as General Purpose I/O (GPIO), Flash, IEEE 802 two-wire Management Data I/O Interface (MDIO), Serial Management Interface (SMI), Universal Asynchronous Receiver-Transmitters (UARTs), two-wire serial interface (TWSI), and other serial interfaces.

A Schedule/Sync and Order (SSO) module 602 queues and schedules work for the processor cores 640*a-k*. The network service processor 650 includes a timer unit 649 that may be used by the SSO module 602 to schedule work for the processor cores 640*a-k*. The SSO module 602 may be further configured to schedule large memory transaction (LMT) stores (LMTSTs) across the processor cores 640*a-k*. With reference to FIG. 1 and FIG. 6A, the LMT store 106 may be scheduled by the SSO 602. LMTSTs may arrive at the IOB 638 in any-order, and may get cached in a LMTST Scheduling Widget (LSW) (not shown) of the IOB 638. The SSO module 602 may then signal the LSW to release each LMTST in the correct order. Overall scheduled LMTST flow is similar to a LMTST flow disclosed above. The SSO module 602 may assign a guest-workslot (GWS) that may be used for ordering a LMTST, and such GWS may be cached in the GWC 342 of FIG. 3, disclosed above.

Continuing with reference to FIG. 6A, the processor cores 640*a-k* may request work from the SSO module 648. The SSO module 602 selects (i.e., schedules) work for one of the processor cores of the processor cores 640*a-k* and returns a pointer to the work-queue entry describing the work to a given processor core of the processor cores 640*a-k*.

Each processor core includes an instruction cache 652 and Level-1 data cache 654. In one embodiment, the network services processor 650 includes 24 processor cores 640*a-k*. In some embodiments, each of the processor cores 640*a-k* may be an implementation of the Arm® architecture, such as the Armv8.2 64-bit architecture and may be compatible with the Armv8.2 software ecosystem and include hardware floating point, single instruction multiple data (SIMD), and memory management unit (MMU) support. In such an embodiment, consistent with the Armv8.2 architecture, the processor cores 640*a-k* may contain full hardware support for virtualization. Guest operating systems can thus run at Arm defined user and operating system privilege levels, and hypervisor software can run in a separate higher privilege level. The processor cores 640*a-k* may also support a secure state in which software may run in three different privilege levels while hardware provides isolation from the non-secure state. It should be understood that a total number of the processor cores 640*a-k* is not limited to 24 and that an architecture of the processor cores 640*a-k* is not limited to a 64-bit architecture or to the Armv8.2 64-bit architecture.

The LLC 631 and external DRAM 608 are shared by all of the processor cores 640*a-k* and I/O co-processor devices (not shown). Each processor core is coupled to the LLC 631 by the CMI 644. The CMI 644 is a communication channel for all memory and I/O transactions between the processor cores 640*a-k*, the IOB 638 and the LLC 631. In one embodiment, the CMI 644 is scalable to multiple (e.g., 24) processor cores 640*a-k*, supporting fully-coherent Level-1 data caches 654 with write through. The CMI 644 may be highly-buffered with the ability to prioritize I/O.

The controller 630 of the LLC 631 maintains memory reference coherence. It returns the latest copy of a block for every fill request, whether the block is stored in LLC 631, in external DRAM 608, or is "in-flight." A plurality of DRAM controllers 633 supports the external DRAM 608, and can support preferred protocols, such as the DDR4 protocol.

After a packet has been processed by the processor cores 640*a-k*, the interface unit 663 reads the packet data from the LLC 631, DRAM 608, performs L3 network protocol and L4 transport protocol post-processing (e.g., generates a TCP/UDP checksum), forwards the packet through the interface unit 663 and frees the LLC 631/DRAM 608 used by the packet. The DRAM Controllers 633 manage in-flight transactions (loads/stores) to/from the DRAM 608.

A resource virtualization unit (RVU) 662 may enable software to map various local function (LF) resources in various modules into several physical functions (PFs) and virtual functions (VFs). This enables multi-unit software drivers compatible with Linux®, Windows® and the data plane development kit (DPDK).

A management module 626 may include various units for managing operation of the network services processor 650. For example, the management module 626 may include a temperature sensor, a power serial bus master interface to determine current performance and energy consumption, and a memory diagnostic controller to detect and report memory errors. The management module 626 may further include control processors, such as a system control processor (not shown) for power management and other secure chip management tasks, and a module control processor (not shown) for module management and other non-secure chip management tasks.

Figure 6B:
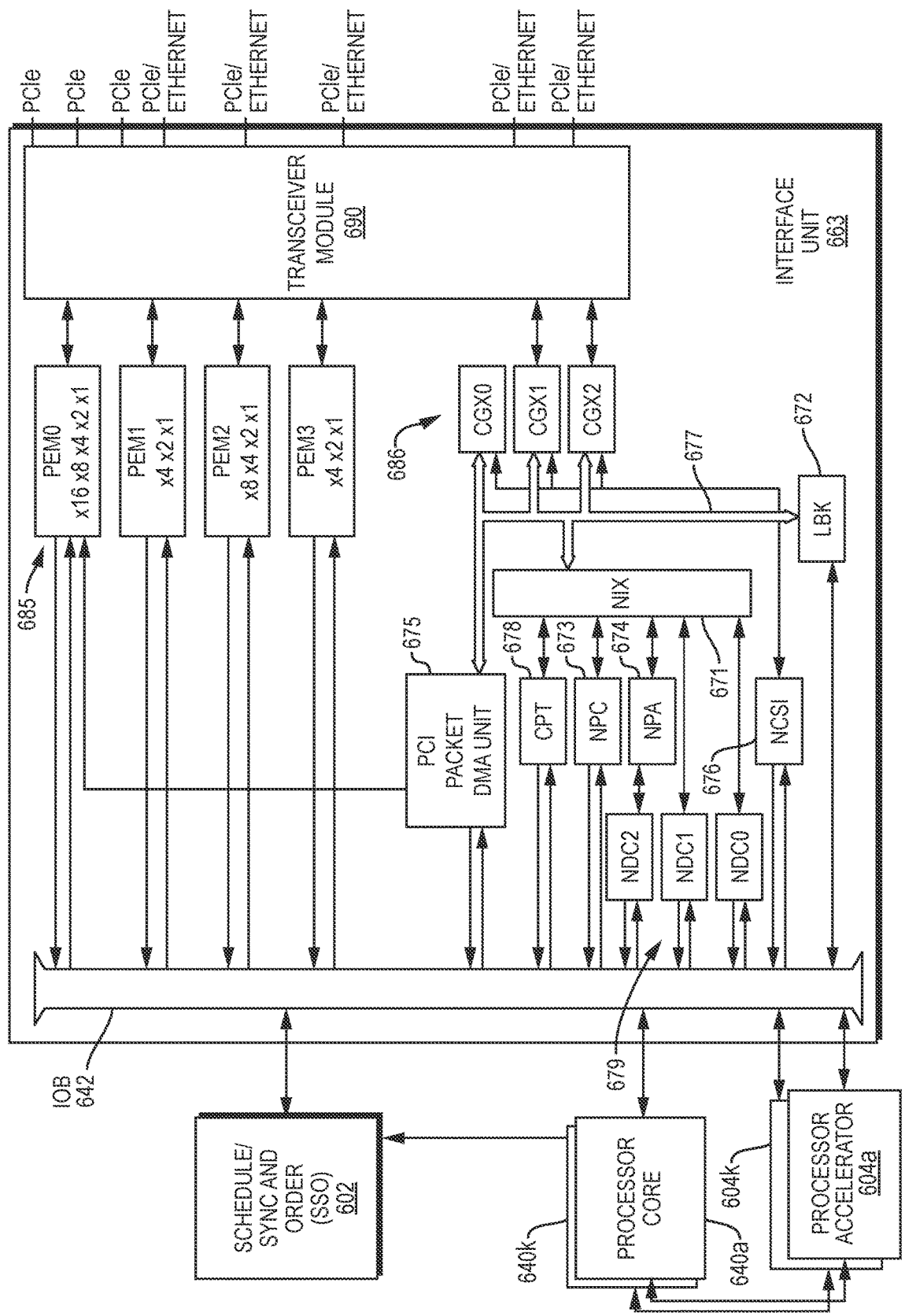
FIG. 6B is a block diagram of an example embodiment of an interface unit of the network services processor of FIG. 6A.

FIG. 6B is a block diagram of an example embodiment of the interface unit 663 of the network services processor 650 of FIG. 6A, disclosed above. Transceiver module 690 transmits and receives signals in accordance with one or more communications protocols, such as PCIe, Ethernet. Interface modules, including PCI Express interface units (PEM0-PEM3) 685, and Ethernet I/O controllers (CGX0-CGX2) 686 process received and outgoing signals in accordance with their respective protocols. A network controller sideband interface (NCSI) unit 676 provides an interface and protocol controller for a NCSI bus 677, which provides network packet data from/to the Ethernet I/O controllers (CGX0-CGX2) 686.

A network interface unit (NIX) 671 provides a controller (not shown) and direct memory access (DMA) engines (not shown) to process and move network packets (not shown). The NIX 671 transmits and receives packets to and from the aforementioned interfaces modules 685 and communicates with the SSO module 602 to schedule work for the processor cores 640*a-k* to further process the packets. The NIX 671 may also communicate with the processor cores 640*a-k* to forward work in lieu of the SSO module 602 and can receive packets from the processor cores 640*a-k* for transmission. The NIX 671 may include a transmit subunit (NIX-TX) (not shown) and a receive subunit (NIX-RX) (not shown), and a loopback module (LBK) 672 enables packets transmitted by the NIX-TX to be looped back and received by the NIX-RX.

The NIX 671 operates with a number of coprocessors. In particular, a network parser CAM unit (NPC) 673 parses network packets received for, or transmitted from, the NIX 671. A network pool allocator unit (NPA) 674 may allocate and free pointers for packet, work-queue entry, send descriptor buffers, and may support integration with a virtualization scheme. The SSO module 602, as described above, schedules work-queue entries for NIX packets. A cryptographic accelerator unit (CPT) 678 optionally decrypts Internet Protocol Security (IPsec) packets received by the NIX 671 and can encrypt data for outgoing packets. The interface unit 663 includes a PCI packet DMA unit 675 that may DMA packet data between the NIX 671, CGX0-CGX2, PEM0-PEM3 685, or LBK 672 and the LLC 631 or DRAM 608, disclosed above with regard to FIG. 6A. The interface unit 663 further includes a data cache (NDC0-NDC1) 679 that is a common data cache block for use by the NIX 671 and NPA 674.

The elements of the block and flow diagrams described herein may be combined or divided in any manner in software, hardware, or firmware. If implemented in software, the software may be written in any language that can support the example embodiments disclosed herein. The software may be stored in any form of computer readable medium, such as random-access memory (RAM), read only memory (ROM), compact disk read-only memory (CD-ROM), and so forth. In operation, a general purpose or application-specific processor or processing core loads and executes software in a manner well understood in the art. It should be understood further that the block and flow diagrams may include more or fewer elements, be arranged or oriented differently, or be represented differently. It should be understood that implementation may dictate the block, flow, and/or network diagrams and the number of block and flow diagrams illustrating the execution of embodiments disclosed herein.

The teachings of all patents, published applications and references cited herein are incorporated by reference in their entirety.

While example embodiments have been particularly shown and described, it will be understood by those skilled in the art that various changes in form and details may be made therein without departing from the scope of the embodiments encompassed by the appended claims.

What is claimed is:

1. A system comprising:
a processor accelerator configured to perform a large memory transaction (LMT) store of a data set in response to an instruction, the LMT store including storing data from the data set, atomically, based on a LMT line (LMTLINE), the LMTLINE wider than a data-processing width of a processor issuing the instruction,
the processor accelerator further configured to send, to the processor, a response to the instruction.

2. The system of claim 1, wherein the data set includes a plurality of LMT lines (LMTLINEs) of data and wherein the response is a single response to the instruction that is based on completion of the LMT store of the plurality of LMTLINES of data of the data set.

3. The system of claim 1, wherein the processor is configured to perform work in parallel with the LMT store performed by the processor accelerator.

4. The system of claim 1, wherein the LMT store of the data set, in its entirety, appears, from the perspective of the processor, as having been performed via a single instruction.

5. The system of claim 1, wherein the processor accelerator is employed by the processor, exclusively.

6. The system of claim 1, wherein the system is a system-on-a-chip (SoC) and wherein the SoC includes the processor and processor accelerator.

7. The system of claim 1, wherein the storing includes iteratively storing data from the data set, atomically, on a LMTLINE-by-LMTLINE basis.

8. The system of claim 1, further comprising memory and wherein the processor is configured to store the data set, in its entirety, to the memory prior to issuing the instruction.

9. The system of claim 1, further comprising memory and wherein the processor is configured to:
map a contiguous region of the memory as cacheable memory; and
store the data set, in its entirety, to the contiguous region of the memory.

10. The system of claim 1, further comprising memory, wherein the data set is associated with a pairing of a physical function (PF) and a virtual function (VF), wherein the VF is associated with the PF, wherein the processor is configured to store the data set in a contiguous region of the memory, and wherein the contiguous region of the memory is associated with the pairing of the PF and VF.

11. The system of claim 1, wherein the processor accelerator includes a LMT physical-address cache (LPC) and wherein the processor accelerator is further configured to store a physical address (PA) of a LMTLINE of data from the data set in the LPC in association with a PF identifier of a PF and a VF identifier of a VF, the VF associated with PF, the PF and VF associated with the data set.

12. The system of claim 1, wherein the data set includes a plurality of LMT lines (LMTLINEs) of data and wherein the processor accelerator is further configured to determine a total number of LMTLINEs of the plurality of LMTLINEs of the data set based on the instruction.

13. The system of claim 1, further comprising a last level cache (LLC) controller and an input/output bridge (IOB) and wherein the storing includes:
issuing at least one read instruction to the LLC controller to request a LMTLINE of data from the data set;
issuing a write command to the IOB; and
sending the LMTLINE of data requested to the IOB for storing, atomically, the sending based on a) receipt of the LMTLINE of data requested and b) receipt of an acknowledgement from the IOB to the write command issued.

14. The system of claim 13, wherein the processor accelerator is further configured to perform the issuing of the at least one read instruction, issuing of the write command, and sending of the LMTLINE of data, iteratively, on a LMTLINE-by-LMTLINE basis.

15. The system of claim 13, wherein the IOB includes a LMT store scheduling widget (LSW), wherein the LSW is configured to assign a LSW identifier (ID) to the LMT store for ordering the LMT store relative to another LMT store, wherein the acknowledgment includes the LSW ID, and wherein sending the LMTLINE of data to the IOB includes sending the LSW ID with the LMTLINE of data.

16. The system of claim 1, further comprising a non-coherent fully associative cache, a first memory, and a second memory, wherein the processor accelerator is further configured to obtain a physical address (PA) at which the data set is stored in the first memory, wherein the PA is obtained via the non-coherent fully associative cache or the second memory, wherein the processor accelerator is further configured to issue at least one read instruction to request a LMTLINE of data from the data set, and wherein the at least one read instruction includes an address of the LMTLINE, the address based on the PA obtained.

17. The system of claim 1, wherein the processor accelerator includes a plurality of engines, wherein an engine of the plurality of engines is configured to handle the LMT store and wherein another engine of the plurality of engines is configured to handle another LMT store of a different data set, different from the data set handled by the LMT store.

18. A method comprising:
performing, by a processor accelerator, a large memory transaction (LMT) store of a data set in response to an instruction from a processor, the processor associated with a data-processing width, the data set corresponding to the instruction, the performing including storing data from the data set, atomically, based on a LMT line (LMTLINE), the LMTLINE wider than the data-processing width; and
sending, from the processor accelerator to the processor, a response to the instruction.

19. The method of claim 18, wherein the data set includes a plurality of LMT lines (LMTLINEs) of data and wherein the response is a single response to the instruction that is based on completion of the LMT store of the plurality of LMTLINES of data of the data set.

20. The method of claim 18, further comprising performing work, by the processor, in parallel with performing the LMT store by the processor accelerator.

21. The method of claim 18, wherein the LMT store of the data set, in its entirety, appears, from the perspective of the processor, as having been performed via a single instruction.

22. The method of claim 18, wherein the processor accelerator is employed by the processor, exclusively.

23. The method of claim 18, wherein the processor and processor accelerator are included in a system-on-a-chip (SoC).

24. The method of claim 18, wherein the storing includes iteratively storing data from the data set, atomically, on a LMTLINE-by-LMTLINE basis.

25. The method of claim 18, further comprising, by the processor, storing the data set, in its entirety, to memory prior to issuing the instruction.

26. The method of claim 18, further comprising:
mapping, by the processor, a contiguous region of the memory as cacheable memory; and
storing, by the processor, the data set, in its entirety, to the contiguous region of the memory.

27. The method of claim 18, wherein the data set is associated with a pairing of a physical function (PF) and a virtual function (VF), wherein the VF is associated with the PF, wherein the method further comprises storing, by the processor, the data set in a contiguous region of memory, and wherein the contiguous region of the memory is associated with the pairing of the PF and VF.

28. The method of claim 18, wherein the processor accelerator includes a LMT physical-address cache (LPC) and the method further comprises storing, by the processor accelerator, a physical address (PA) of a LMTLINE of data from the data set in the LPC in association with a PF identifier of a PF and a VF identifier of a VF, the VF associated with the PF, the PF and VF associated with the data set.

29. The method of claim 18, wherein the data set includes a plurality of LMT lines (LMTLINEs) of data and wherein the method further comprises determining, by the processor accelerator, a total number of LMTLINEs of the plurality of LMTLINEs of the data set based on the instruction.

30. The method of claim 18, wherein the storing includes:
issuing at least one read instruction to a last level cache (LLC) controller to request a LMTLINE of data from the data set;
issuing a write command to an input/output bridge (IOB); and
sending the LMTLINE of data requested to the IOB for storing, atomically, the sending based on a) receipt of the LMTLINE of data requested and b) receipt of an acknowledgement from the IOB to the write command issued.

31. The method of claim 30, further comprising performing the issuing of the at least one read instruction, issuing of the write command, and sending of the LMTLINE of data, iteratively, on a LMTLINE-by-LMTLINE basis.

32. The method of claim 30, wherein the IOB includes a LMT store scheduling widget (LSW) and wherein the method further comprises assigning, by the LSW, a LSW identifier (ID) to the LMT store for ordering the LMT store relative to another LMT store, wherein the acknowledgment includes the LSW ID, and wherein sending the LMTLINE of data to the IOB includes sending the LSW ID with the LMTLINE of data.

33. The method of claim 18, further comprising:
obtaining, by the processor accelerator, a PA at which the data set is stored in a first memory, the obtaining including obtaining the PA via a non-coherent fully associative cache or a second memory; and
issuing, by the processor accelerator, at least one read instruction to request a LMTLINE of data from the data set, wherein the at least one read instruction includes an address of the LMTLINE, the address based on the PA obtained.

34. The method of claim 18, further comprising:
handling the LMT store by an engine of the plurality of engines; and
handling another LMT store of a different data set, different from the data set handled by the LMT store, by another engine of the plurality of engines.

35. An apparatus comprising:
means for performing a large memory transaction (LMT) store of a data set in response to an instruction from a processor, the data set corresponding to the instruction, the performing including storing data from the data set, atomically, based on a LMT line (LMTLINE), the LMTLINE wider than a data-processing width of the processor; and
means for sending, to the processor, a response to the instruction.

* * * * *

UNITED STATES PATENT AND TRADEMARK OFFICE
CERTIFICATE OF CORRECTION

| | | |
|---|---|---|
| PATENT NO. | : 12,282,658 B1 | Page 1 of 1 |
| APPLICATION NO. | : 18/583457 | |
| DATED | : April 22, 2025 | |
| INVENTOR(S) | : Aadeetya Shreedhar et al. | |

It is certified that error appears in the above-identified patent and that said Letters Patent is hereby corrected as shown below:

In the Specification

In Column 1, Line 49, delete "LMTLINES" and insert -- LMTLINEs --, therefor.

In Column 6, Line 65, delete "may a" and insert -- may be a --, therefor.

In Column 7, Line 35, delete "may" and insert -- may be --, therefor.

In Column 9, Line 17, delete "vice versus," and insert -- vice versa, --, therefor.

In Column 10, Line 35, delete "NCBWrData_Imtid 453." and insert -- NCBWrData_lmtid 453. --, therefor.

In the Claims

In Column 15, Lines 63-64, in Claim 2, delete "LMTLINES" and insert -- LMTLINEs --, therefor.

In Column 17, Line 28, in Claim 19, delete "LMTLINES" and insert -- LMTLINEs --, therefor.

Signed and Sealed this
Third Day of February, 2026

John A. Squires
*Director of the United States Patent and Trademark Office*